(12) United States Patent
Loesche et al.

(10) Patent No.: US 11,279,057 B2
(45) Date of Patent: Mar. 22, 2022

(54) MATERIAL REMOVAL APPARATUS, SYSTEM, AND METHOD

(71) Applicant: The Boeing Company, Chicago, IL (US)

(72) Inventors: Christopher R. Loesche, Bothell, WA (US); Jacob E. Koopmans, Everett, WA (US); Jonathan Y. Ahn, Seattle, WA (US)

(73) Assignee: The Boeing Company, Chicago, IL (US)

( * ) Notice: Subject to any disclaimer, the term of this patent is extended or adjusted under 35 U.S.C. 154(b) by 126 days.

(21) Appl. No.: 16/719,527

(22) Filed: Dec. 18, 2019

(65) Prior Publication Data

US 2021/0187777 A1 Jun. 24, 2021

(51) Int. Cl.
*B32B 43/00* (2006.01)
*B26F 3/00* (2006.01)
*B32B 38/10* (2006.01)

(52) U.S. Cl.
CPC ............ *B26F 3/002* (2013.01); *B32B 43/006* (2013.01); *B32B 38/10* (2013.01); *Y10T 156/1168* (2015.01); *Y10T 156/1184* (2015.01); *Y10T 156/1195* (2015.01); *Y10T 156/1961* (2015.01); *Y10T 156/1978* (2015.01)

(58) Field of Classification Search
CPC . B32B 38/10; B32B 43/006; Y10T 156/1168; Y10T 156/1184; Y10T 156/1195; Y10T 156/1961; Y10T 156/1978
See application file for complete search history.

(56) References Cited

U.S. PATENT DOCUMENTS

| | | | | |
|---|---|---|---|---|
| 3,028,280 | A * | 4/1962 | Hoffman | A61F 13/023 428/41.7 |
| 5,096,370 | A * | 3/1992 | Mohr | B65H 3/322 271/161 |
| 5,282,918 | A * | 2/1994 | Heist | B26D 3/282 156/765 |
| 5,460,681 | A * | 10/1995 | Horner | B29C 63/0013 156/183 |
| 6,966,966 | B2 * | 11/2005 | Koizumi | B65H 5/025 156/702 |
| 8,991,463 | B2 * | 3/2015 | Jeong | B32B 43/006 156/759 |

(Continued)

OTHER PUBLICATIONS

Magswitch Magsquare 400, Magswitch Technology, https://magswitch.com/product/magsquare-400/ access Dec. 18, 2019.

*Primary Examiner* — Mark A Osele
*Assistant Examiner* — Nickolas R Harm
(74) *Attorney, Agent, or Firm* — Kunzler Bean & Adamson

(57) ABSTRACT

Disclosed herein is an apparatus for removing material from a surface of a carrier. The apparatus comprises a buckling mechanism that comprises a gripper configured to engage the material. When engaged with the material, the gripper is movable relative to the surface of the carrier to move the material relative to the surface of the carrier and to form a buckle in the material. The apparatus also comprises a separation mechanism that is coupled to the buckling mechanism and comprises a wedge that is movable relative to the surface of the carrier to be insertable into the buckle formed in the material.

20 Claims, 11 Drawing Sheets

(56) References Cited

U.S. PATENT DOCUMENTS

| | | | |
|---|---|---|---|
| 10,081,173 B2 * | 9/2018 | Choi | B32B 43/006 |
| 10,464,704 B2 * | 11/2019 | Mizutani | B65C 9/0006 |
| 2011/0083790 A1 * | 4/2011 | Kimura | B32B 41/00 156/64 |
| 2012/0312481 A1 * | 12/2012 | Kang | B29C 63/0013 156/715 |
| 2014/0065416 A1 * | 3/2014 | Niwa | B32B 43/006 428/355 AC |
| 2014/0368024 A1 * | 12/2014 | Heger | F16F 15/324 301/5.21 |
| 2015/0059987 A1 * | 3/2015 | Kumakura | B26D 1/04 156/714 |
| 2015/0318200 A1 * | 11/2015 | Ohno | H01L 21/67092 414/797 |
| 2015/0343754 A1 * | 12/2015 | Itoh | B32B 43/006 156/715 |
| 2016/0159069 A1 * | 6/2016 | Huang | B32B 43/006 156/707 |

\* cited by examiner

MATERIAL REMOVAL APPARATUS, SYSTEM, AND METHOD

FIELD

This disclosure relates generally to forming materials used in manufacturing processes, and more particularly to removing materials from carrier surfaces.

BACKGROUND

Some parts are made from one or more layers of material in the form of sheets. According to one manufacturing technique, the layers of material are processed or shaped while temporarily fixed on the surface of a carrier. Removing such material, or portions of such material, from the surface of the carrier can be difficult using conventional manual techniques.

SUMMARY

The subject matter of the present application provides examples of a system, apparatus, and a method for removing a material from a carrier that overcome at least some of the shortcomings of prior art techniques. Accordingly, the subject matter of the present application has been developed in response to the present state of the art, and in particular, in response to shortcomings of conventional manual methods for removing a material from a carrier.

Disclosed herein is an apparatus for removing material from a surface of a carrier. The apparatus comprises a buckling mechanism that comprises a gripper configured to engage the material. When engaged with the material, the gripper is movable relative to the surface of the carrier to move the material relative to the surface of the carrier and to form a buckle in the material. The apparatus also comprises a separation mechanism that is coupled to the buckling mechanism and comprises a wedge that is movable relative to the surface of the carrier to be insertable into the buckle formed in the material. The preceding subject matter of this paragraph characterizes example 1 of the present disclosure.

The apparatus further comprises a clamping mechanism coupled to the buckling mechanism and the separation mechanism. The clamping mechanism is configured to selectively clamp the apparatus onto the material when the material is on the surface of the carrier. The gripper frictionally engages the material when the apparatus is selectively clamped onto the material by the clamping mechanism. The wedge is insertable into the buckle when the apparatus is selectively clamped onto the material by the clamping mechanism. The clamping mechanism is configured to selectively unclamp the apparatus from the material after the wedge is inserted into the buckle formed in the material. The preceding subject matter of this paragraph characterizes example 2 of the present disclosure, wherein example 2 also includes the subject matter according to example 1, above.

The clamping mechanism comprises at least one magnet that is selectively activatable to magnetically couple the apparatus to the carrier. The preceding subject matter of this paragraph characterizes example 3 of the present disclosure, wherein example 3 also includes the subject matter according to example 2, above.

The clamping mechanism comprises at least one vacuum that is selectively operable to generate a suction force between the apparatus and the carrier. The preceding subject matter of this paragraph characterizes example 4 of the present disclosure, wherein example 4 also includes the subject matter according to any one of examples 2-3, above.

The gripper is rotatable relative to the surface of the carrier to move the material relative to the surface of the carrier. The preceding subject matter of this paragraph characterizes example 5 of the present disclosure, wherein example 5 also includes the subject matter according to any one of examples 1-4, above.

The gripper is rotatable about a rotational axis. The gripper is asymmetrical relative to a virtual plane parallel to and passing through the rotational axis. The preceding subject matter of this paragraph characterizes example 6 of the present disclosure, wherein example 6 also includes the subject matter according to example 5, above.

The gripper is shaped to eccentrically rotate about the rotational axis. The preceding subject matter of this paragraph characterizes example 7 of the present disclosure, wherein example 7 also includes the subject matter according to example 6, above.

The buckling mechanism comprises two grippers. The two grippers are counter-rotatable relative to each other to move corresponding portions of the material, relative to the surface of the carrier and toward each other, to form the buckle between the two grippers. The preceding subject matter of this paragraph characterizes example 8 of the present disclosure, wherein example 8 also includes the subject matter according to any one of examples 6-7, above.

The gripper comprises a material engagement surface that comprises friction-enhancing features. The preceding subject matter of this paragraph characterizes example 9 of the present disclosure, wherein example 9 also includes the subject matter according to any one of examples 5-8, above.

The wedge is translationally movable relative to the surface of the carrier in an insertion direction for insertion of the wedge into the buckle. The wedge comprises at least one leading edge and at least one blade surface that terminates at the at least one leading edge and tapers along the wedge in a direction perpendicular to the at least one leading edge. The preceding subject matter of this paragraph characterizes example 10 of the present disclosure, wherein example 10 also includes the subject matter according to any one of examples 1-9, above.

The at least one leading edge converges, relative to a hypothetical plane perpendicular to the surface of the carrier, passing through the wedge, and parallel with the insertion direction, toward the buckle when the gripper is engaged with the material and forms the buckle. The preceding subject matter of this paragraph characterizes example 11 of the present disclosure, wherein example 11 also includes the subject matter according to example 10, above.

The wedge comprises two leading edges and two blade surfaces each corresponding with a respective one of the two leading edges. The two leading edges converge toward each other. The preceding subject matter of this paragraph characterizes example 12 of the present disclosure, wherein example 12 also includes the subject matter according to example 11, above.

The wedge comprises a plurality of pneumatic ports through which a gas is forcibly expellable. The preceding subject matter of this paragraph characterizes example 13 of the present disclosure, wherein example 13 also includes the subject matter according to any one of examples 1-12, above.

The wedge is translationally movable relative to the surface of the carrier in an insertion direction for insertion of the wedge into the buckle. The wedge comprises at least one leading edge and at least one blade surface that terminates at the at least one leading edge and tapers along the wedge in a direction perpendicular to the at least one leading edge. The plurality of pneumatic ports are formed in the at least one blade surface of the wedge. The preceding subject matter of this paragraph characterizes example 14 of the present disclosure, wherein example 14 also includes the subject matter according to example 13, above.

The apparatus further comprises comprising a position sensor that is translationally fixed relative to the gripper and configured to detect a distance between the position sensor and the material on the surface of the carrier. The preceding subject matter of this paragraph characterizes example 15 of the present disclosure, wherein example 15 also includes the subject matter according to any one of examples 1-14, above.

The apparatus further comprises a robot coupler coupled to the buckling mechanism and the separation mechanism, wherein the robot coupler is configured to interface with an apparatus coupler of a robot. The preceding subject matter of this paragraph characterizes example 16 of the present disclosure, wherein example 16 also includes the subject matter according to any one of examples 1-15, above.

The apparatus further comprises a manual handling assembly coupled to the buckling mechanism and the separation mechanism, wherein the manual handling assembly comprises a manual control interface and manual handles. The preceding subject matter of this paragraph characterizes example 17 of the present disclosure, wherein example 17 also includes the subject matter according to any one of examples 1-16, above.

Further disclosed herein is a system that comprises a positioning tool, which comprises an apparatus coupler. The system also comprises an apparatus for removing material from a surface of a carrier. The apparatus comprises a positioning-tool coupler that is releasably coupleable to the positioning tool. The apparatus also comprises a buckling mechanism that comprises a first actuator and a gripper configured to engage the material. When engaged with the material, the gripper is movable relative to the surface of the carrier, via operation of the first actuator, to move the material relative to the surface of the carrier and to form a buckle in the material. The apparatus further comprises a separation mechanism that is coupled to the buckling mechanism and comprises a second actuator and a wedge that is movable relative to the surface of the carrier, via operation of the second actuator, to be insertable into the buckle formed in the material. The apparatus additionally comprises a clamping mechanism coupled to the buckling mechanism and the separation mechanism and configured to selectively clamp the apparatus onto the material when the material is on the surface of the carrier. The gripper engages the material when the apparatus is selectively clamped onto the material by the clamping mechanism. The wedge is insertable into the buckle when the apparatus is selectively clamped onto the material by the clamping mechanism. The clamping mechanism is configured to selectively unclamp the apparatus from the material after the wedge is inserted into the buckle formed in the material. The preceding subject matter of this paragraph characterizes example 18 of the present disclosure.

Additionally disclosed herein is a method of removing a first material from a surface of a carrier. The method comprises determining a first material on a surface of a carrier. The method also comprises positioning a buckling mechanism onto the first material on the surface of the carrier such that a gripper of the buckling mechanism is engaged with the first material. The method further comprises moving the gripper relative to the surface of the carrier to move the first material relative to the surface of the carrier and to form a buckle in the first material. The method additionally comprises inserting a wedge in an insertion direction into the buckle formed in the first material. The method also compromises with the wedge inserted into the buckle, moving the wedge in a removal direction along the surface of the carrier. The preceding subject matter of this paragraph characterizes example 18 of the present disclosure.

The method further comprises selectively clamping the gripper onto the first material on the surface of the carrier while the gripper is moved relative to the surface of the carrier to form the buckle and while the wedge is inserted into the buckle. The method additionally includes selectively unclamping the gripper from the first material on the surface of the carrier after inserting the wedge into the buckle and before moving the wedge in the removal direction along the surface of the carrier. The preceding subject matter of this paragraph characterizes example 20 of the present disclosure, wherein example 20 also includes the subject matter according to example 19, above.

The described features, structures, advantages, and/or characteristics of the subject matter of the present disclosure may be combined in any suitable manner in one or more examples, including embodiments and/or implementations. In the following description, numerous specific details are provided to impart a thorough understanding of examples of the subject matter of the present disclosure. One skilled in the relevant art will recognize that the subject matter of the present disclosure may be practiced without one or more of the specific features, details, components, materials, and/or methods of a particular example, embodiment, or implementation. In other instances, additional features and advantages may be recognized in certain examples, embodiments, and/or implementations that may not be present in all examples, embodiments, or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific examples that are illustrated in the appended drawings. Understanding that these drawings depict only typical examples of the subject matter, they are not therefore to be considered to be limiting of its scope. The subject matter will be described and explained with additional specificity and detail through the use of the drawings, in which.

DETAILED DESCRIPTION

Reference throughout this specification to "one example," "an example," or similar language means that a particular feature, structure, or characteristic described in connection with the example is included in at least one example of the present disclosure. Appearances of the phrases "in one example," "in an example," and similar language throughout this specification may, but do not necessarily, all refer to the same example. Similarly, the use of the term "implementation" means an implementation having a particular feature, structure, or characteristic described in connection with one or more examples of the present disclosure, however, absent an express correlation to indicate otherwise, an implementation may be associated with one or more examples.

Figure 1:
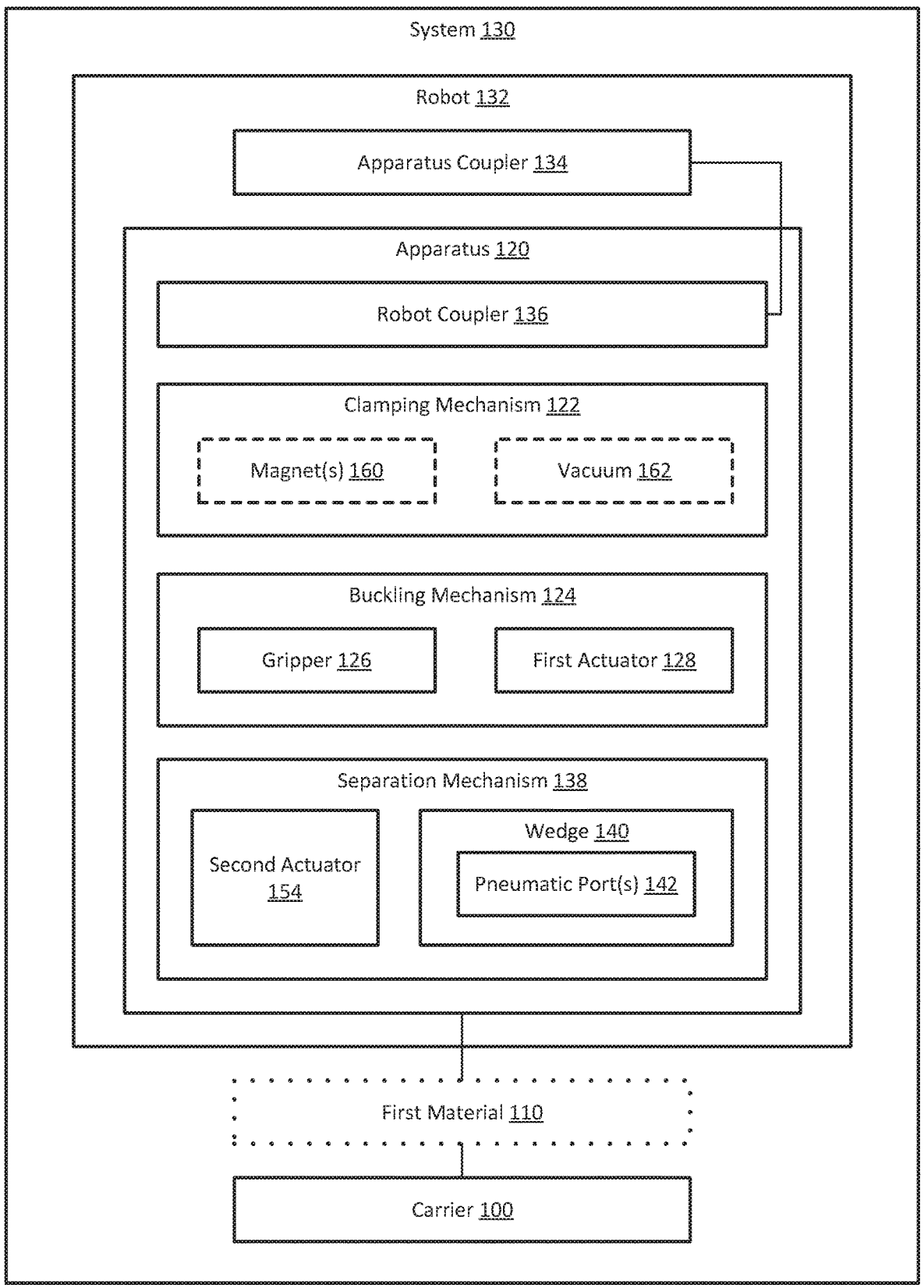
FIG. 1 is a schematic block diagram of a system for removing a first material from a surface of a carrier, according to one or more examples of the present disclosure.

In FIG. 1, referred to above, solid lines, if any, connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the block diagrams may also exist. Dashed lines, if any, connecting blocks designating the various elements and/or components represent couplings similar in function and purpose to those represented by solid lines; however, couplings represented by the dashed lines may either be selectively provided or may relate to alternative examples of the subject matter, disclosed herein. Likewise, elements and/or components, if any, represented with dashed lines, indicate alternative examples of the subject matter, disclosed herein. One or more elements shown in solid and/or dashed lines may be omitted from a particular example without departing from the scope of the subject matter, disclosed herein. Environmental elements, if any, are represented with dotted lines. Virtual (imaginary) elements may also be shown for clarity. Those skilled in the art will appreciate that some of the features illustrated in FIG. 1 may be combined in various ways without the need to include other features described in FIG. 1, other drawing figures, and/or the accompanying disclosure, even though such combination or combinations are not explicitly illustrated herein. Similarly, additional features not limited to the examples presented, may be combined with some or all of the features shown and described herein.

Disclosed herein is a system, an apparatus, and a method, for removing a first material (e.g., scrap material) from a surface, such as the surface of a carrier, that reduce the labor and costs associated with conventional manual techniques for removing the first material from a carrier. Some parts are made from one or more layers of a second material (e.g., part material) in the form of sheets. A second material sheet may be created from a source material sheet that is cut into shape while temporarily fixed on the surface of a carrier. The source material sheet can be difficult to remove from the surface of the carrier. Accordingly, separating or removing any unused, cut material portions (e.g., scrap portions or trimmed portions) from the source material sheet after the source material sheet is cut into the second material sheet can be difficult. The system, apparatus, and method of the present disclosure helps to automatically buckle the first material and insert a separation tool into the buckle, which helps to separate the first material (e.g., material to be removed or scraped) from the carrier leading to efficient and easy removal of the first material from the carrier.

Referring to FIG. 1, according to some examples, a system 130 of the present disclosure includes an apparatus 120 in the form of a material removal tool. The apparatus 120 includes a buckling mechanism 124 and a separation mechanism 138. The system 130 also includes a carrier 100 in certain examples. The carrier 100 supports a first material 110 on the carrier 100. As used herein, the carrier 100 can be any of various objects capable of supporting a material thereon. In various examples, the apparatus 120 additionally includes a clamping mechanism 122 coupled to the buckling mechanism 124 and the separation mechanism 138. The clamping mechanism 122 is configured to selectively clamp the apparatus 120 onto the first material 110, by generating a clamping force, when the first material 110 is on the surface 102 of the carrier 100. The clamping mechanism 122 has one or both of at least one magnet 160 and at least one vacuum 162 to help facilitate the clamping of the apparatus 120 onto the first material 110. The magnet 160 is magnetically attracted to the carrier 100 to magnetically couple the apparatus 120 to the carrier 100 and thus onto the first material 110. In contrast, the vacuum 162 is configured to selectively generate a suction force that retains the apparatus 120 against the first material 110. Accordingly, the clamping force generated by the clamping mechanism 122 is one or both of a magnetic force or a suction force.

The buckling mechanism 124 includes at least one gripper 126 that is configured to frictionally engage the first material 110 to place the apparatus 120, from a nonengaged position, into an engaged position. The buckling mechanism 124 additionally includes at least one first actuator 128 that is configured to actuate a corresponding gripper 126. When frictionally engaged with the first material 110, the first actuator 128 is operable to automatically actuate (e.g., move) the gripper 126 relative to the surface 102 of the carrier 100 to correspondingly move a portion of the first material 110 relative to the surface 102 to form a buckle 170 in the first material 110. The clamping force of the clamping mechanism 122 helps to promote and retain frictionally engagement between the gripper 126 and the first material 110 as the gripper 126 is actuated to form the buckle 170. In alternative examples, the apparatus 120 does not include a clamping mechanism 122 and relies instead on the weight of the apparatus 120 to provide the clamping force necessary to promote the frictional engagement between the gripper 126 and the first material 110. Although described as frictional engagement in some examples, in other examples, the gripper 126 engages the first material 110 using any of various engagement techniques other than frictional engagement.

The separation mechanism 138 includes a wedge 140 and a second actuator 154. The second actuator 154 is operable to automatically actuate the wedge 140 relative to the surface 102 of the carrier 100 to insert the wedge 140 into the buckle 170 in the first material 110 formed by the buckling mechanism 124. Inserting the wedge 140 into the buckle 170 positions the wedge 140 underneath the first material 110 and between the first material 110 and the surface 102 of the carrier 100. Accordingly, buckling the first material 110 with the buckling mechanism 124 allows the wedge 140 to be quickly and easily positioned underneath the first material 110. In such a position underneath the first material 110, and with the clamping mechanism 122 selectively unclamped from the first material 110, the wedge 140 can be moved laterally along the first material 110 to separate the first material 110 from the surface 102 of the carrier 100 at locations away from the buckle 170. Separating the first material 110 from the surface 102 of the carrier 100 allows the first material 110 to be easily removed from the carrier 100. Removal of the first material 110 from the carrier 100, following separation of the first material 110 by the separation mechanism 138, can be performed by the apparatus 120 itself or by another automated tool or manually. The first material 110 removed from the carrier 100 can be scraped or reused.

As used herein, a source material 104 can be any of various materials, a second material 106 can be used to form a part or used for any of various purposes, and a first material 110 can be scraped, used on a part, or used for any of various purposes without departing from the essence of the present disclosure. Accordingly, in certain examples, the first material 110 is a scrap material (or material to be scrapped or discarded), the second material 106 is a part material (or material to be used to form a part), and the apparatus 120 is a scrap removal tool.

According to some examples, the system 130 additionally includes a robot 132. The robot 132 can be any of various robots, such as a multiple-axis robotic arm, that is programmable to perform desired movements or operations. In some implementations, the robot 132 is one of a gantry robot or an articulated robot. The robot 132 includes an apparatus coupler 134 and the apparatus 120 includes a robot coupler 136. The apparatus coupler 134 and the robot coupler 136 are releasably engageable to couple together the robot 132 and the apparatus 120. In one example, the apparatus 120 is an end effector, the robot coupler 136 is a robot interface, and the apparatus coupler 134 is an end effector interface that releasably interfaces with the robot interface to facilitate communication, power, and/or fluid transfer between the robot 132 and the apparatus 120. Although the system 130 of FIG. 1 includes a robot 132 and the apparatus 120 includes a robot coupler 136, in some examples, the system 130 includes a positioning tool, which can be a robot, manipulator, or any of various tools capable of positioning the apparatus 120 relative to the carrier 100, and the apparatus 120 includes a positioning-tool coupler that can be releasably engageable with the positioning tool.

According to certain examples, the system 130 facilitates automated positioning and operation of the apparatus 120. Therefore, the system 130 can include an electronic controller that is programmable to automatically control the positioning of the apparatus 120 relative to the carrier 100 and the clamping, buckling, and separating operations of the apparatus 120, as described in more detail below.

Figure 2:
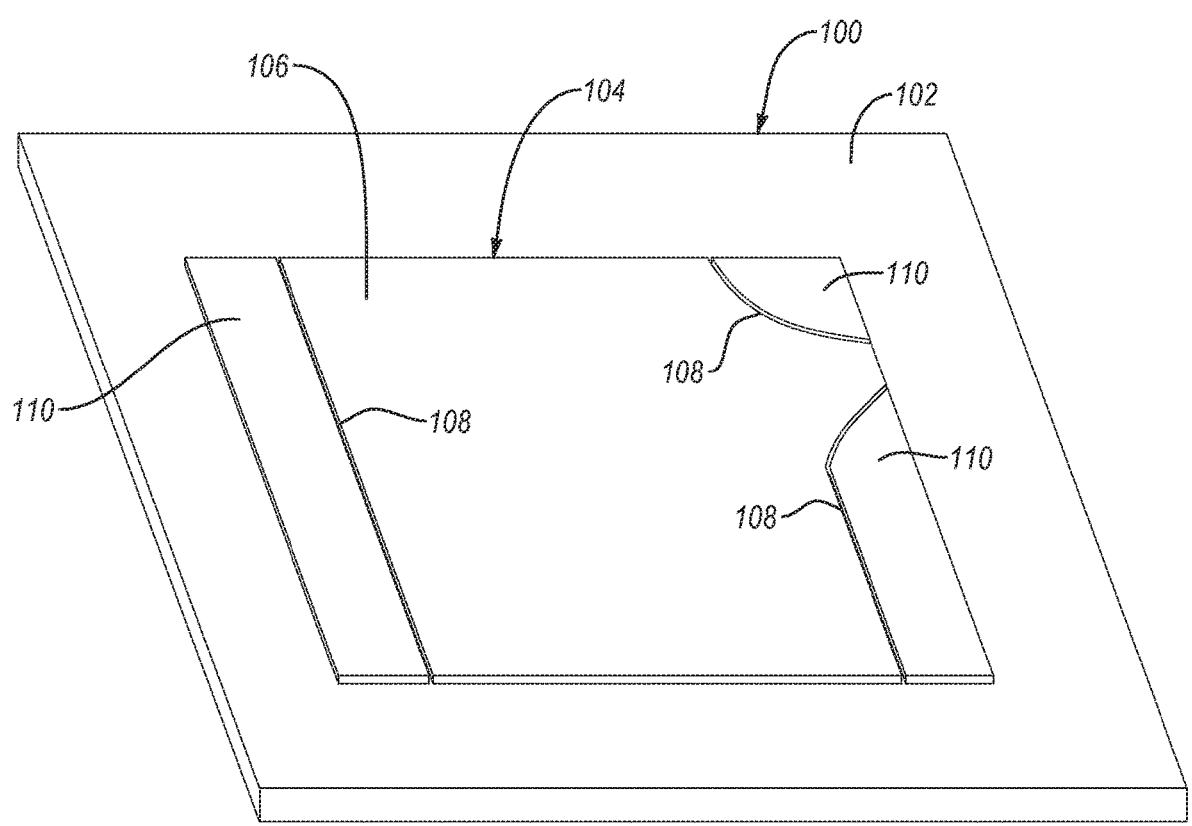
FIG. 2 is a perspective view of a source material on a surface of a carrier, where the source material has been cut into a second material and first materials, according to one or more examples of the present disclosure.
Figure 16:
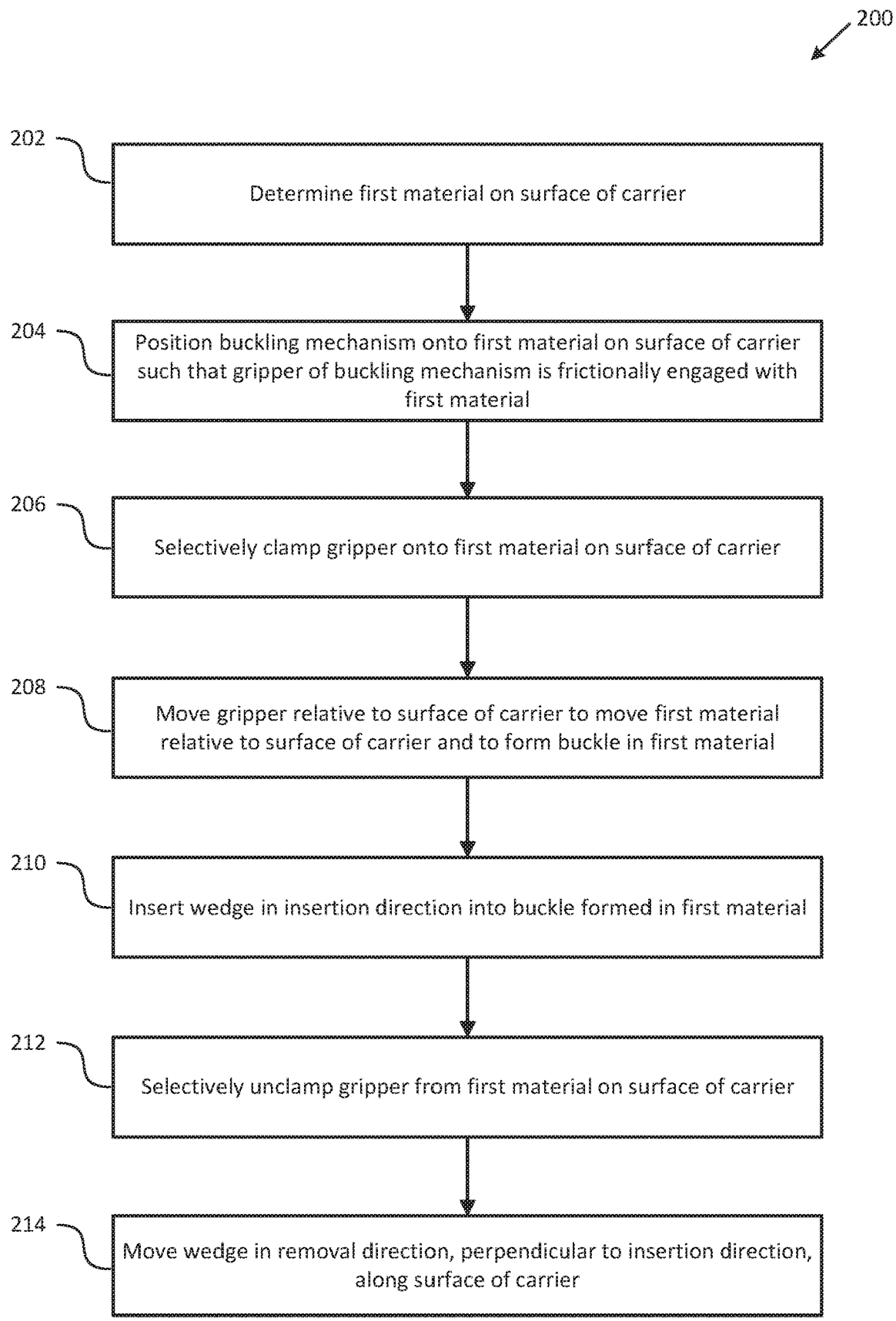
FIG. 16 is a schematic flow diagram of a method of removing first material from a surface of a carrier, according to one or more examples of the present disclosure.

Referring now to FIG. 16, according to some examples, a method 200 of removing the first material 110 from the surface 102 of the carrier 100 includes (block 202) determining (e.g., identifying or selecting) the first material 110 on the surface 102 of the carrier 100. As shown in FIG. 2, the source material 104 is temporarily fixed on the surface 102 of the carrier 100. Prior to determining the first material 110 and the second material 106, the source material 104 is separated (e.g., cut), while on the surface 102 of the carrier 100, into the second material 106 and the first material 110. Accordingly, in some examples, determining the first material 110 at block 202 includes distinguishing between the first material 110 and the second material 106 and directly or indirectly identifying the first material 110 in preparation for removal of the first material 110 from the carrier 100.

The carrier 100 is any of various rigid structures and the surface 102 can be a substantially planar surface. In certain examples, the carrier 100 is made of a metallic material, such as ferromagnetic material (e.g., such as certain iron alloys, nickel alloys, cobalt alloys, and some rare earth alloys). Temporary fixation of the source material 104 onto the surface 102 of the carrier 100 can be provided in various ways. According to one example, the source material 104 includes a film that promotes adhesion between the source material 104 and the surface 102. The film can be made of an adhesive material or a tacky material that keeps the source material 104 flush against the surface 102 as the source material 104 is being cut according to block 202 of the method 200. In an alternative example, the carrier 100 includes a vacuum system that generates a suction force to retain the source material 104 flush against the surface 102 as it is being cut. For example, the carrier 100 can include a plurality of ports fluidly coupled with a vacuum source that draws air through the ports.

The source material 104 can be various flexible materials in a sheet-like form. In other words, the source material 104 is a sheet of material having a thickness significantly smaller than a length or width of the sheet. In one example, the source material 104 is a composite tape lamination made of at least two interlaminated layers of a fiber-reinforced polymeric material, such as a carbon-fiber-reinforced polymeric material, fiberglass, and the like. The fibers of each layer of the fiber-reinforced polymeric material are embedded, either unidirectionally or multi-directionally, within a polymeric medium, such as an epoxy or resin, of the layer. When fixed on the carrier 100, the polymeric medium is in an uncured flexible state. Accordingly, the carrier 100 structurally supports the source material 104 as the source material 104 is cut into the second material 106 and the first material 110.

Referring again to FIG. 2, cut lines 108 or separation lines separate the second material 106 from the first material 110. The cut lines 108 are formed by any of various separation or cutting tools known in the art. The cut lines 108 define the shape of the second material 106, which, when removed from the carrier 100, is used to form all or a portion of a part. In one example, where the source material 104 is an uncured fiber-reinforced polymeric material, the second material 106 is removed from the carrier 100, formed into a desired shape of, or on, the part and cured to harden and set the polymeric medium. The first material 110, which can be one piece or multiple pieces as shown, is also removed from the carrier 100 and discarded or recycled. In some examples, the first material 110 is removed from the carrier 100 before the second material 106 is removed from the carrier 100. In other examples, the first material 110 is removed from the carrier 100 after the second material 106 is removed from the carrier 100. As presented above, the system 130 and the apparatus 120 are configured to help remove the first material 110 from the carrier 100. More specifically, where the source material 104 includes an adhesive film, the system 130 and the apparatus 120 help to remove the first material 110, including the adhesive film, from the carrier 100 without leaving behind significant amounts of the adhesive film on the surface 102 of the carrier 100. In this manner, the surface 102 of the carrier 100 does not require significant conditioning before the application of a new source material 104.

Referring to FIGS. 4-7, in some examples, the apparatus 120 includes a body 152 to which the clamping mechanism 122, the buckling mechanism 124, and the separation mechanism 138 are attached. Accordingly, movement of the body 152 results in corresponding movement of the clamping mechanism 122, the buckling mechanism 124, and the separation mechanism 138. As used herein, movement of the apparatus 120 means movement of the body 152. According to the system 130, the robot coupler 136 is non-movably fixed to the body 152 such that movement of the robot 132 result in movement of the body 152 and the clamping mechanism 122, the buckling mechanism 124, and the separation mechanism 138 attached to the body 152.

Figure 3:
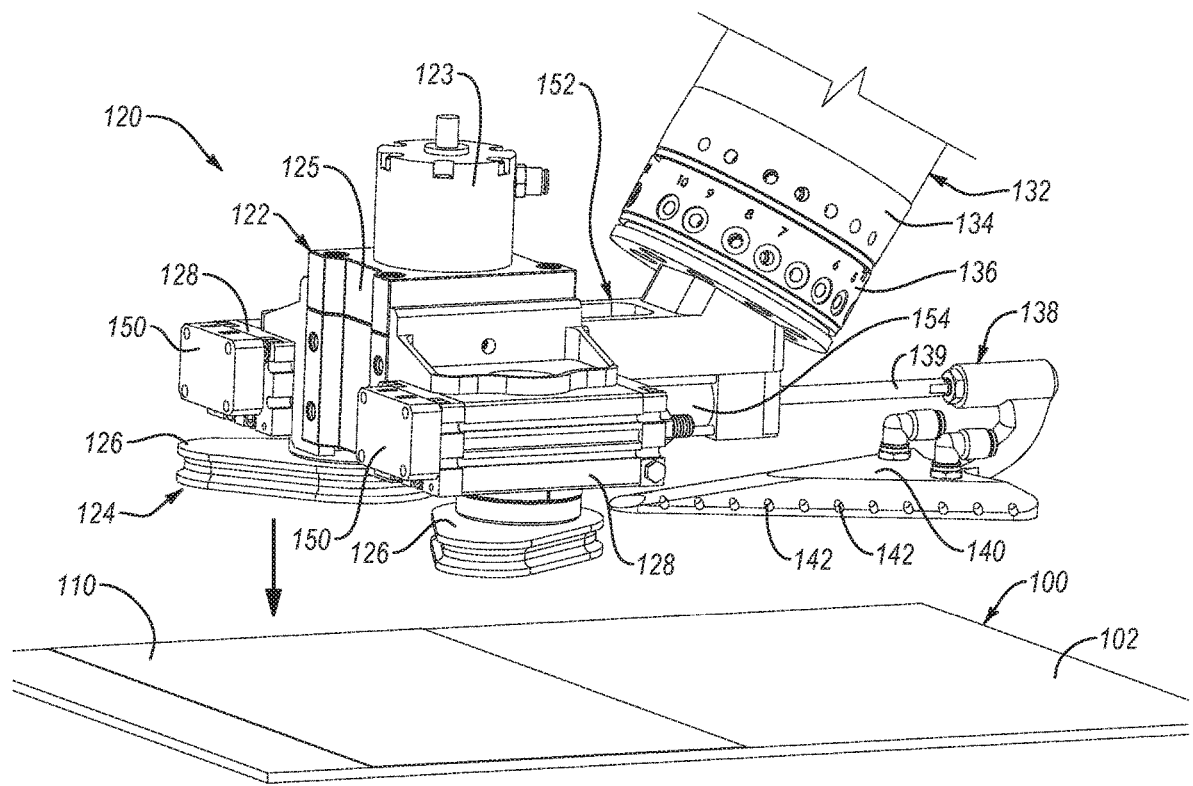
FIG. 3 is a perspective view of an apparatus for removing first material from a surface of a carrier, where the apparatus is shown in a nonengaged position relative to the first material, according to one or more examples of the present disclosure.
Figure 4:
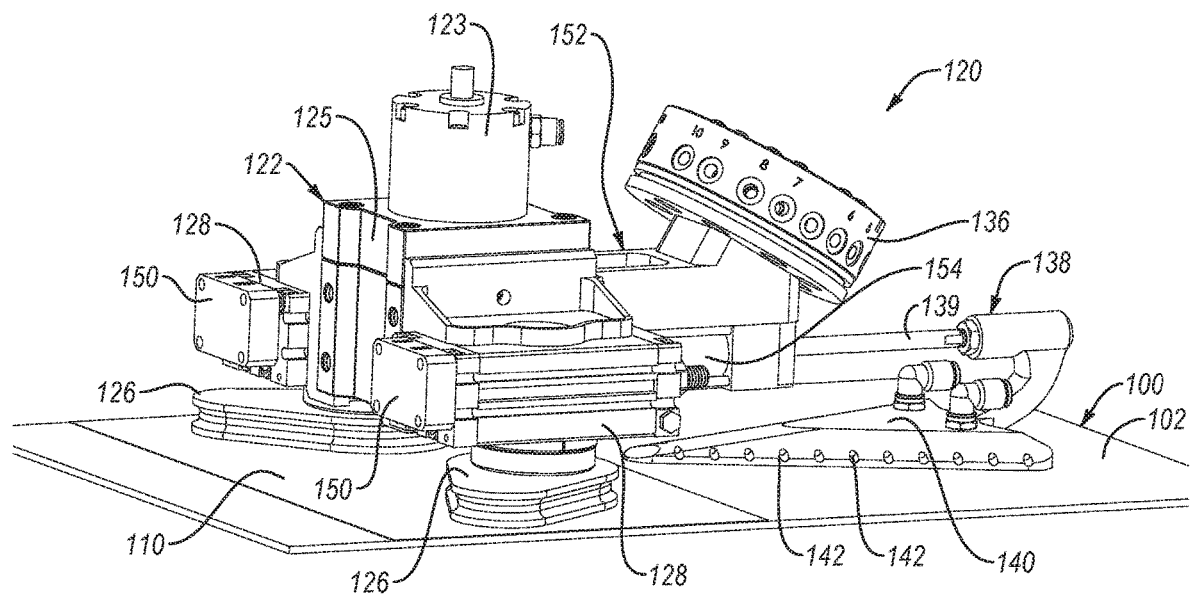
FIG. 4 is a first perspective view of the apparatus of FIG. 3, shown in an engaged position relative to the first material, according to one or more examples of the present disclosure.
Figure 5:
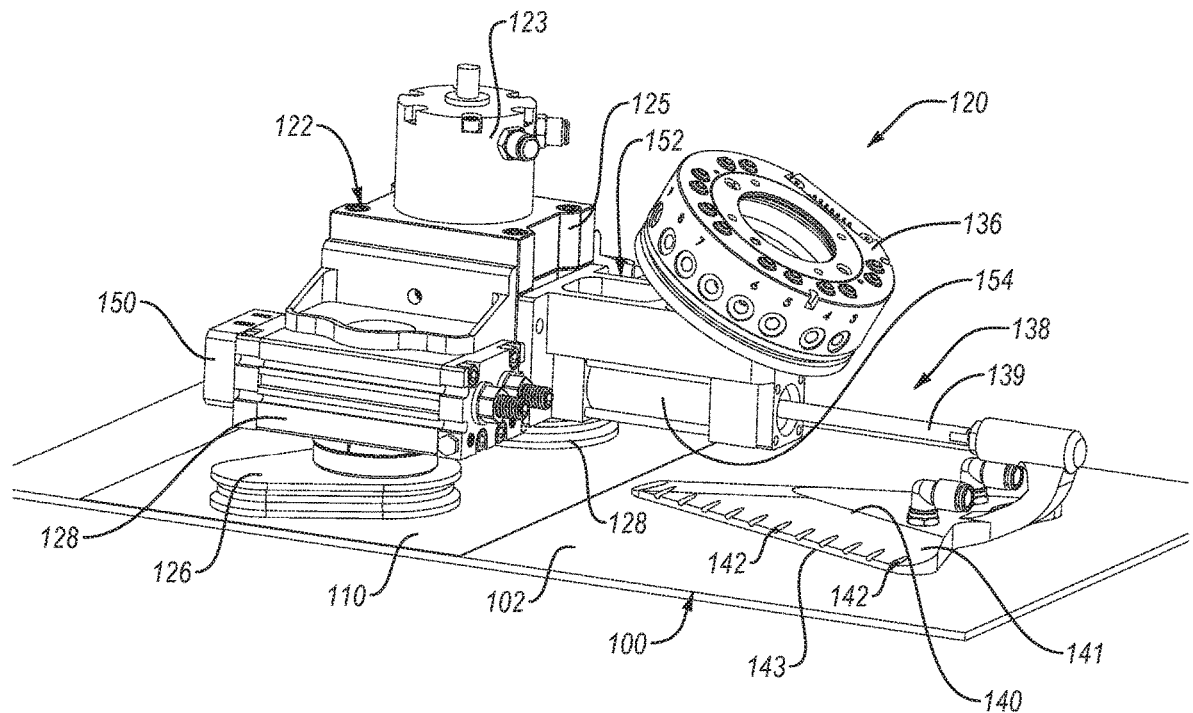
FIG. 5 is a second perspective view of the apparatus of FIG. 3, shown in the engaged position, according to one or more examples of the present disclosure.
Figure 14:
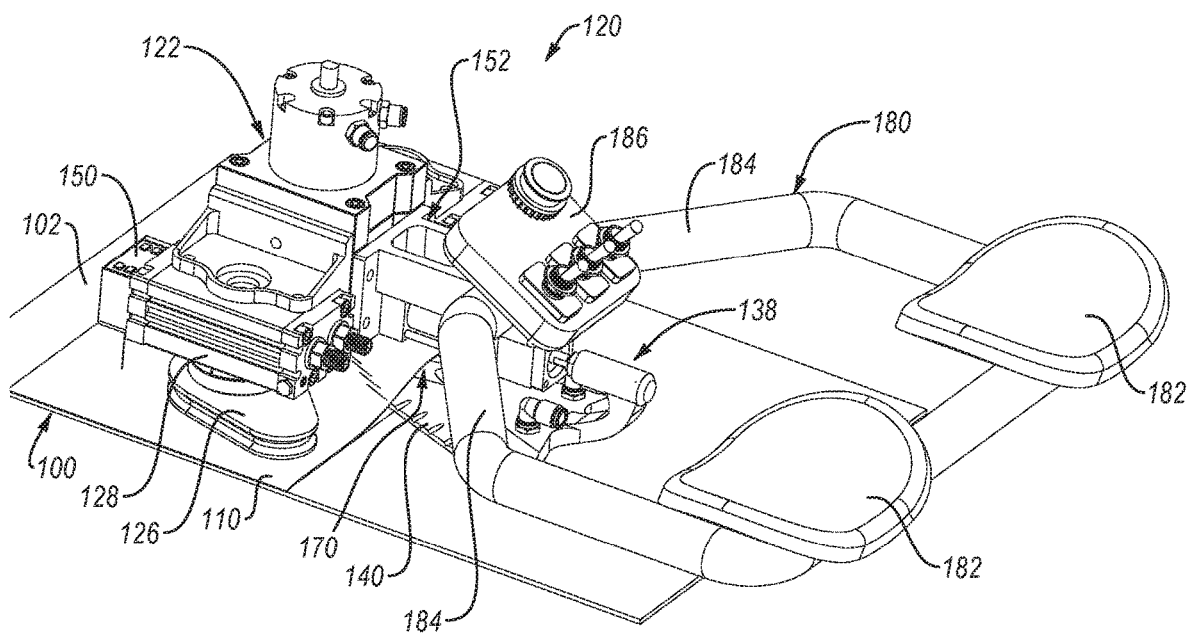
FIG. 14 is a perspective view of an apparatus for removing first material from a surface of a carrier, where the apparatus is shown in an engaged position with a separation mechanism of the apparatus inserted into a buckle of the first material formed by a buckling mechanism of the apparatus, according to one or more examples of the present disclosure.
Figure 15:
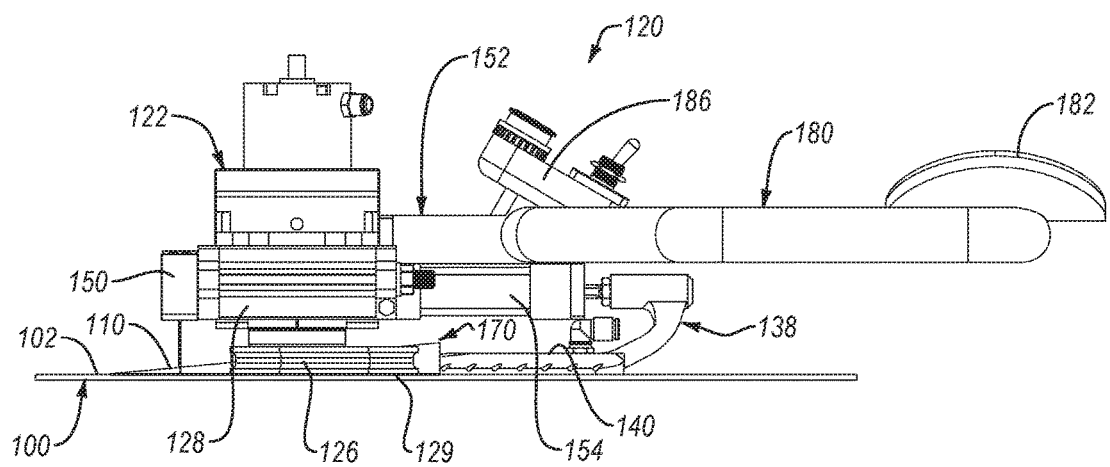
FIG. 15 is a side elevation view of the apparatus of FIG. 14, shown in the engaged position with the separation mechanism of the apparatus inserted into the buckle of the first material formed by the buckling mechanism, according to one or more examples of the present disclosure.

Referring back to FIG. 16, after the source material 104 is separated (e.g., cut) at block 202, the method 200 further includes (block 204) positioning the buckling mechanism 124 of the apparatus 120 onto the first material 110 on the surface 102 of the carrier 100 such that the gripper 126 of the buckling mechanism 124 is frictionally engaged with the first material 110. The method 200 also includes (block 206) selectively clamping the gripper 126 onto the first material 110. As shown in FIG. 3, the apparatus 120 or material removal tool is brought into contact with the first material 110 on the surface 102 of the carrier 100 such that the gripper(s) 126 become frictionally engaged with the first material 110. This can be done automatically, such as via operation of the robot 132 of the system 130, or manually, such as via a manually operated arm or manually-movable configuration of the apparatus 120, such as shown in FIGS. 14 and 15. After the gripper 126 comes in contact with the first material 110, the clamping mechanism 122 is selectively actuated to clamp the gripper 126 to the first material 110.

As shown in FIGS. 4-7, the clamping mechanism 122 includes an electromagnet device 125 attached to the body 152. The electromagnet device 125 includes one or more magnets 160 that are electrically activatable or switchable between a magnetic state and a non-magnetic state. In other words, the magnetic field generated by the electromagnet device 125 can be toggled between ON, in which the magnetic field interacts with the carrier 100 to magnetically couple the apparatus 120 to the carrier 100, and OFF, in which the magnetic field is turned off. One example of an electromagnet device 125 is the Magswitch MagSquare 400, made by Magswitch®. The magnetic coupling between the electromagnet device 125 and the carrier 100 effectually clamps the apparatus 120 down onto the first material 110 on the carrier 100. In some examples, the toggling of the electromagnet device 125 is facilitated by selective actuation of a third actuator 123 mechanically coupled with the electromagnet device 125. The third actuator 123 is a rotary air actuator, which is selectively swivelable in opposing rotational directions to toggle the electromagnet device 125 between ON and OFF. Generally, after the gripper 126 comes in contact with the first material 110, the third actuator 123 is selectively actuated to turn on the magnetic field of the electromagnet device 125 and clamp the apparatus 120, including the gripper 126, to the first material 110.

In alternative examples, instead of the electromagnet device 125, the clamping mechanism 122 includes a vacuum device with at least one vacuum 162 or suction element. The vacuum device is selectively operable to generate a suction force between the apparatus 120 and the carrier 100 that draws together the apparatus 120 and the carrier 100 to effectually clamp the apparatus 120 down onto the first material 110. In yet other examples, the weight of the apparatus 120, with or without a manually-applied force, is enough to generate the required friction for the buckling mechanism 124 to operate.

Figure 6:
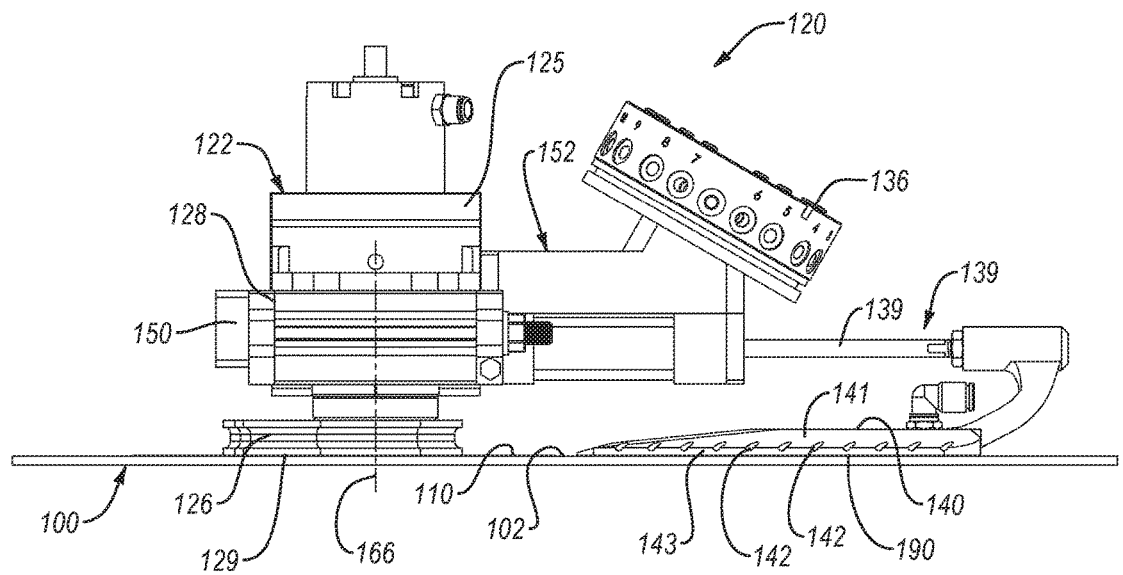
FIG. 6 is a side elevation view of the apparatus of FIG. 3, shown in the engaged position, according to one or more examples of the present disclosure.

The gripper 126 has a material engagement surface 129 (see, e.g., FIG. 6) that is configured to frictionally engage the first material 110. More specifically, the material engagement surface 129 faces the first material 110 and includes friction-enhancing features that facilitate an increase in the coefficient of friction between the gripper 126 and the first material 110. The friction-enhancing features include abrasive surface finishes, treatments, or objects. In one example, the friction-enhancing features include a series of protrusions or undulations formed in the material engagement surface 129. The material engagement surface 129 includes an abrasive sheet that is selectively removable from the gripper 126, such as to replace a worn abrasive sheet with a new abrasive sheet. As seen in FIG. 6, in some example, other than the friction-enhancing features, the material engagement surface 129 is substantially flush (e.g., coplanar) with the first material 110 to optimize the surface area of the material engagement surface 129 in contact with the first material 110.

Frictional engagement between the material engagement surface 129 of the gripper 126 and the first material 110 is enhanced by clamping the apparatus 120 down onto the first material 110 using the clamping mechanism 122. In other words, clamping the apparatus 120 down onto the first material 110 helps to increase the coefficient of friction between the gripper 126 and the first material 110, which in turn promotes the buckling effect on the first material 110. However, in some examples, the material engagement surface 129 of the gripper 126 is such that the coefficient of friction between the gripper 126 and the first material 110 is sufficient to buckle the first material 110 by a clamping force generated only by the weight of the apparatus 120 applied to the first material 110 (i.e., without a clamping mechanism 122 to clamp the apparatus 120 to the first material 110).

Figure 7:
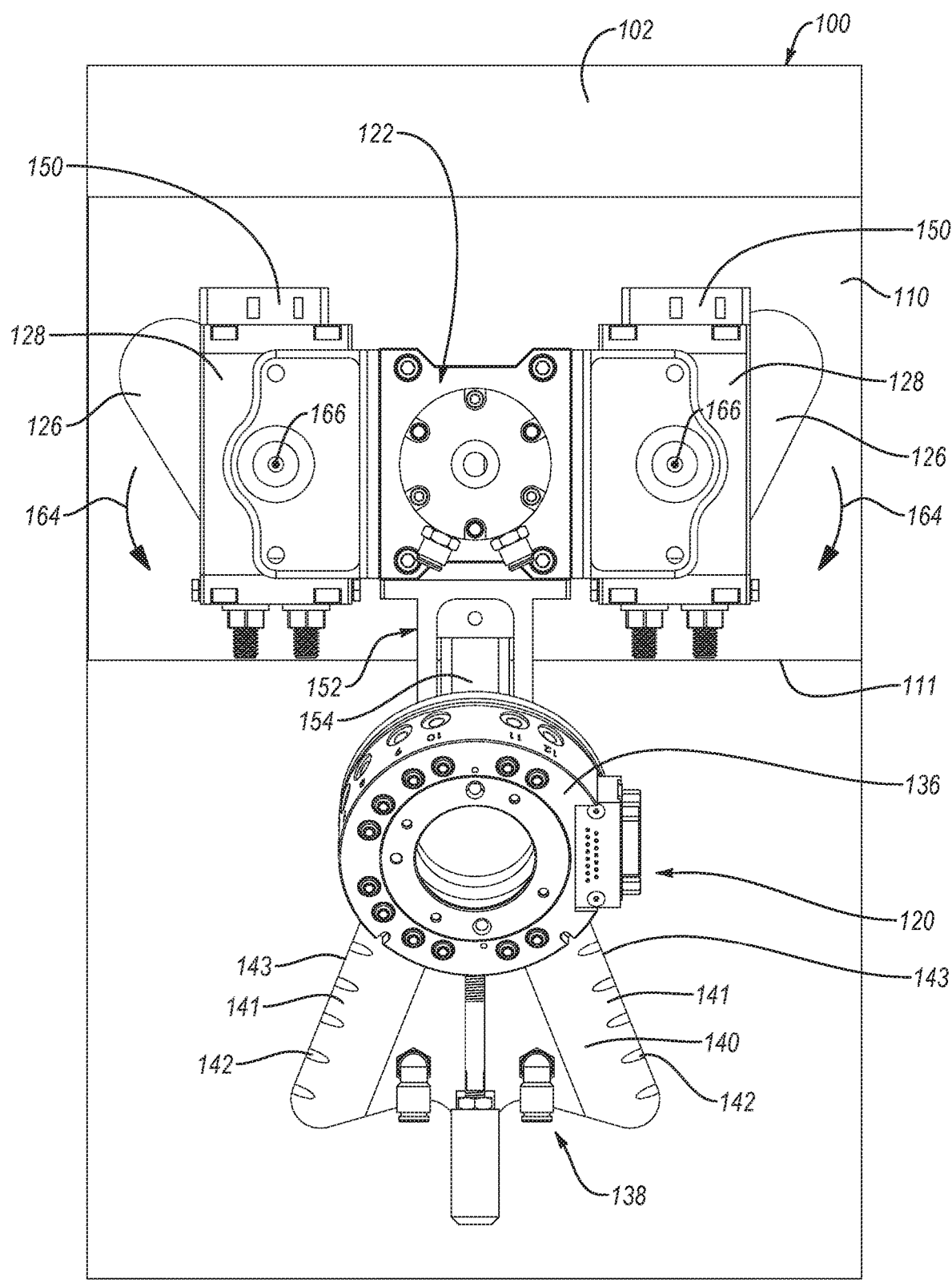
FIG. 7 is a top plan view of the apparatus of FIG. 3, shown in the engaged position, according to one or more examples of the present disclosure.

The gripper 126 has any of various shapes and sizes to accommodate the material engagement surface 129 and allow for a desired movement of the gripper 126 relative to the body 152 and relative to the carrier 100, when the gripper 126 is frictionally engaged with the first material 110. In the illustrated example, the gripper 126 is a puck-like or disk-like element to accommodate rotational movement of the gripper 126 relative to the body 152. Referring to FIGS. 6 and 7, the gripper 126 is rotatable, relative to the body 152, about a rotational axis 166. The rotational axis 166 is perpendicular to the surface 102 of the carrier 100 when the material engagement surface 129 is frictionally engaged with the first material 110. In some examples, the gripper 126 is elongated in a lengthwise direction. Moreover, in the lengthwise direction, a width of the gripper 126 can vary. In the illustrated example, the width of the gripper 126 decreases in the lengthwise direction away from the rotational axis 166 such that the gripper 126 has a substantially teardrop shape or eccentric shape. Accordingly, in some examples, the gripper 126 is asymmetrical relative to a virtual plane that is parallel to and passes through the rotational axis 166. With such an eccentric or asymmetrical shape relative to the rotational axis 166, the gripper 126 is shaped to eccentrically rotate about the rotational axis 166, which can help to increase the moment arm of the gripper 126.

Rotation of the gripper 126 is facilitated by the first actuator 128, which is attached to the body 152 of the apparatus 120 at a location adjacent to the clamping mechanism 122. In the illustrated example, the first actuator 128 can be any of various actuators that are selectively operable to induce rotation of the gripper 126 between a non-buckling position (see, e.g., FIGS. 4-7) and a buckling position (see, e.g., FIGS. 8-13). According to one example, the first actuator 128 is a rotatory actuator that rotates an output shaft in co-rotatable engagement with the gripper 126.

In the illustrated examples, the apparatus 120 includes two grippers 126 that are co-planer relative to each other and spaced apart from each other by the clamping mechanism 122. Both grippers 126 rotate about a corresponding one of two rotational axis 166. Moreover, the grippers 126 are actuatable independently of each other by selective operation of a corresponding one of two first actuators 128 each attached to the body 152 on opposite sides of the clamping mechanism 122. However, the first actuators 128 are configured to counter-rotate the grippers 126 relative to each other. In other words, when one of the first actuators 128 rotates one of the grippers 126, the other one of the first actuators 128 rotates the other one of the grippers 126 in an opposite direction. More specifically, when the grippers 126 are frictionally engaged with the first material 110 and from a perspective facing the first material 110 as shown in FIG. 7, the left one of the grippers 126 rotates counterclockwise about the left rotational axis 166 from the non-buckling position to the buckling position, and the right one of the grippers 126 rotates clockwise about the right rotational axis 166 from the non-buckling position to the buckling position. Put another way, the grippers 126 rotate around the corresponding rotational axes 166 and toward a leading edge 111 of the first material 110 from the non-buckling position to the buckling position. Correspondingly, from the perspective in FIG. 7, the left one of the grippers 126 rotates clockwise about the left rotational axis 166 from the buckling position to the non-buckling position, and the right one of the grippers 126 rotates counterclockwise about the right rotational axis 166 from the buckling position to the non-buckling position.

Figure 8:
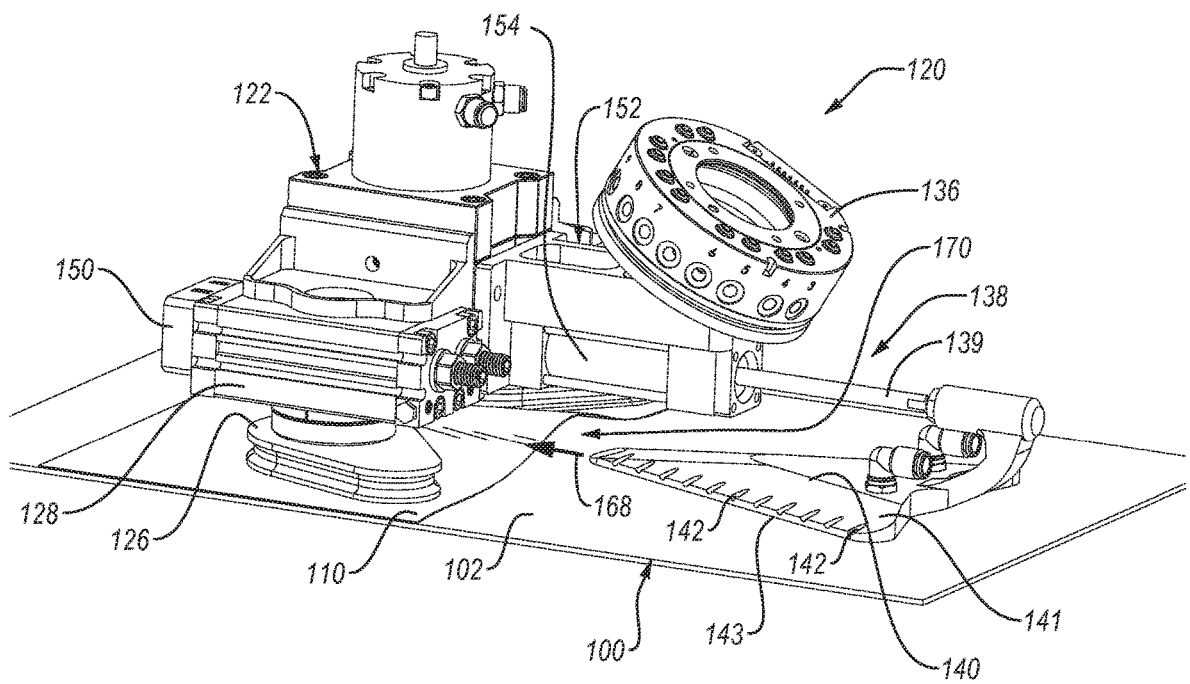
FIG. 8 is a perspective view of the apparatus of FIG. 3, shown in the engaged position with a buckling mechanism of the apparatus actuated to buckle the first material, according to one or more examples of the present disclosure.
Figure 9:
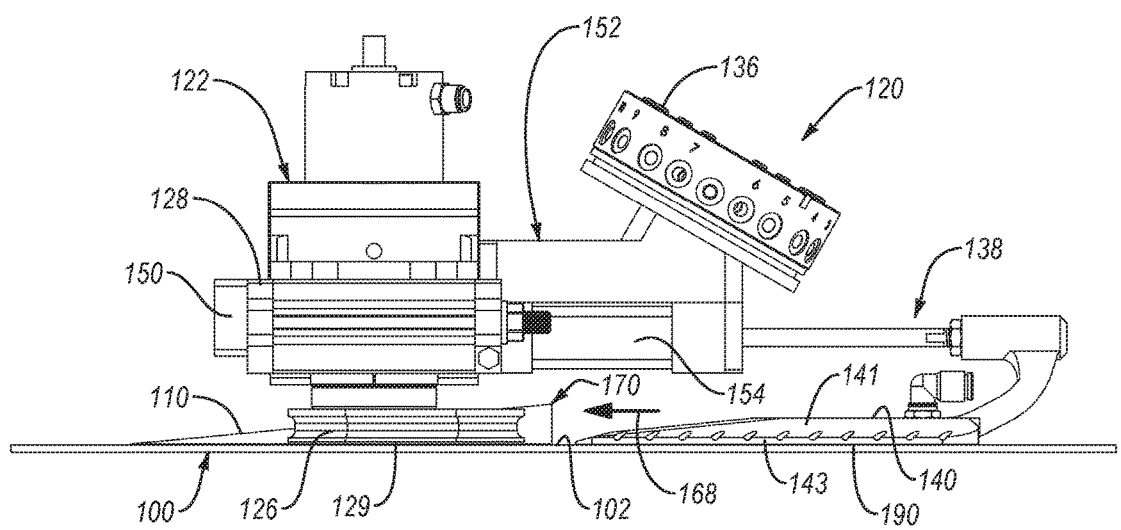
FIG. 9 is a side elevation view of the apparatus of FIG. 3, shown in the engaged position with the buckling mechanism actuated to buckle the first material, according to one or more examples of the present disclosure.
Figure 10:
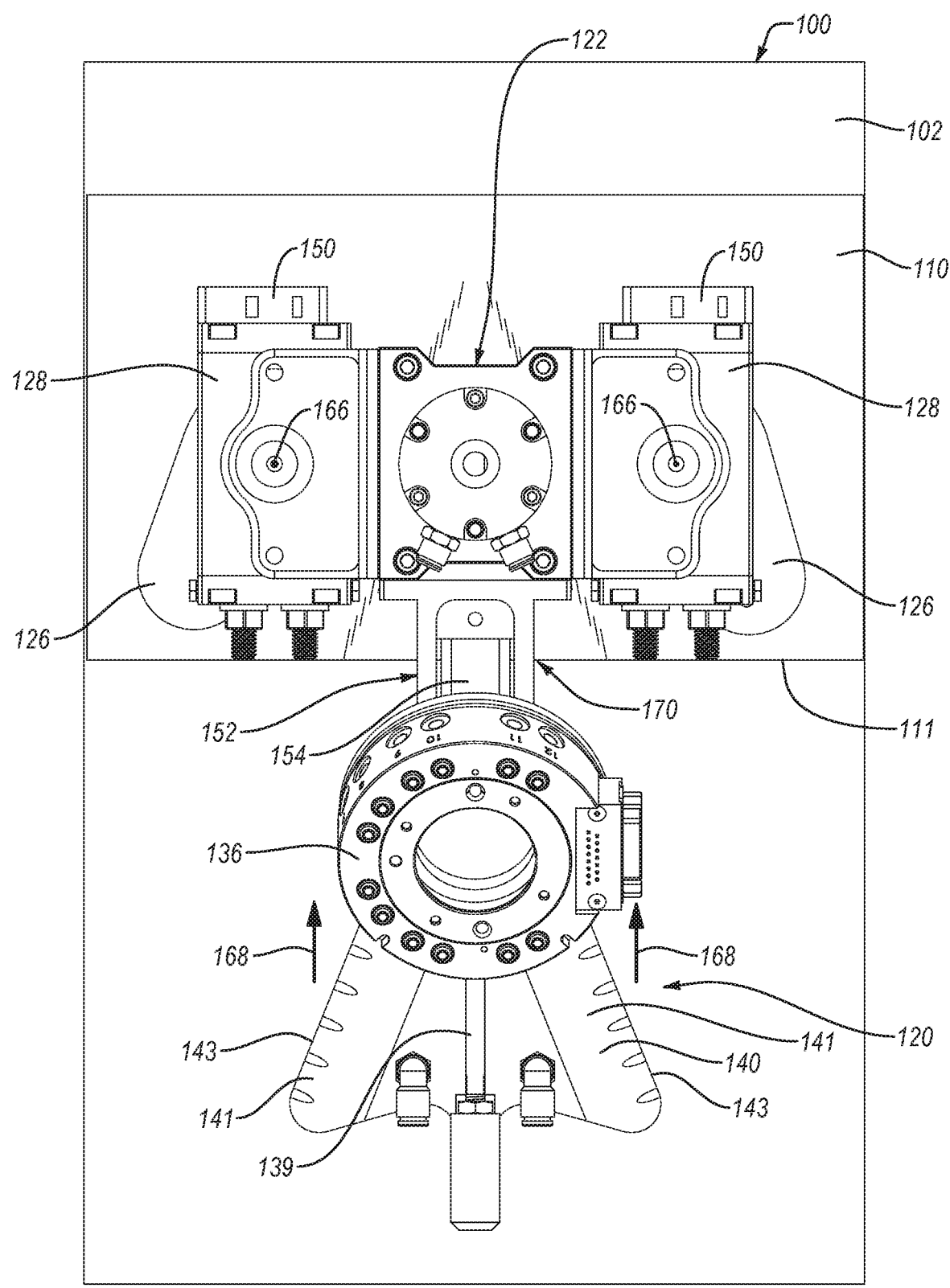
FIG. 10 is a top plan view of the apparatus of FIG. 3, shown in the engaged position with the buckling mechanism actuated to buckle the first material, according to one or more examples of the present disclosure.

Referring back to FIG. 16, the method 200 additionally includes (block 208) moving the gripper(s) 126 relative to the surface 102 of the carrier 100 to move the first material 110 relative to the surface 102 of the carrier 100 and to form a buckle 170 in the first material 110. This step is performed automatically in some examples. As shown in FIGS. 8-10 and according to one example, the step of block 208 is accomplished by counter-rotating the grippers 126 from the non-buckling position to the buckling position. As the grippers 126 rotate, relative to the carrier 100, frictional engagement between the material engagement surfaces 129 of the grippers 126 causes the first material 110 to attach to and co-move with the grippers 126 as the grippers 126 move relative to the carrier 100. In other words, the frictional engagement between the material engagement surfaces 129 of the grippers 126 is enough to overcome the adhesion force or suction force between opposing portions of the first material 110 and the surface 102 of the carrier 100 such that the opposing portions of the first material 110, at least at the leading edge 111, separate from the surface 102 of the carrier 100 and are moved toward each other (e.g., toward a midplane of the apparatus 120). As the opposing portions of the first material 110, separated from the carrier 100, move toward each other, the first material 110 experiences compression at the leading edge 111, which causes the first material 110 at the leading edge 111 to deflect away from the surface 102 of the carrier 100 and form a buckle 170. The buckle 170 is a fold or bend, in at least the leading edge 111 of the first material 110, away from the surface 102 such that a space or gap is defined between the buckle 170 and the surface 102.

Although in the illustrated example, the apparatus 120 includes two grippers 126, in other examples, the apparatus 120 includes more than two grippers 126. Moreover, in some examples, the apparatus 120 includes only one gripper 126. For example, instead of two grippers 126, the apparatus 120 can include one gripper 126 and one stopper that effectively replaces one of the grippers 126. The stopper includes a material engagement surface that frictionally engages the first material 110, like the material engagement surface 129 of the gripper 126. But, instead of moving (e.g., rotating) relative to the carrier 100 to move and separate the first material 110 from the carrier 100, the stopper does not move relative to the carrier 100. Rather, the stopper anchors the first material 110 to the carrier 100 such that the single gripper 126 can move a portion of the first material 110 into compression against the stopper, thus inducing a deflection of the first material 110 away from the carrier 100 and a formation of a buckle 170.

Additionally, although in the illustrated examples the gripper 126 rotates relative to the carrier 100 to form the buckle 170 in the first material 110, which promotes a smaller footprint of the apparatus 120, in other examples, the gripper(s) 126 can linearly translationally move relative to the carrier 100 to form the buckle 170. For example, the first actuators 128 of the buckling mechanism 124 can be configured to translationally linearly move opposing grippers 126 toward each other to compress and form the buckle 170 in the first material 110. As presented above, instead of two linearly-actuated grippers 126, in some examples, one of the linearly-actuated grippers 126 could be effectively replaced with a stopper. In alternative examples, the grippers 126 can be rollers that rotate or spin about respective axes parallel to the first material 110 and parallel to the insertion direction 168 such that as the rollers, in engagement with the first material 110, rotate in opposite directions relative to each other the buckle 170 is formed.

Figure 11:
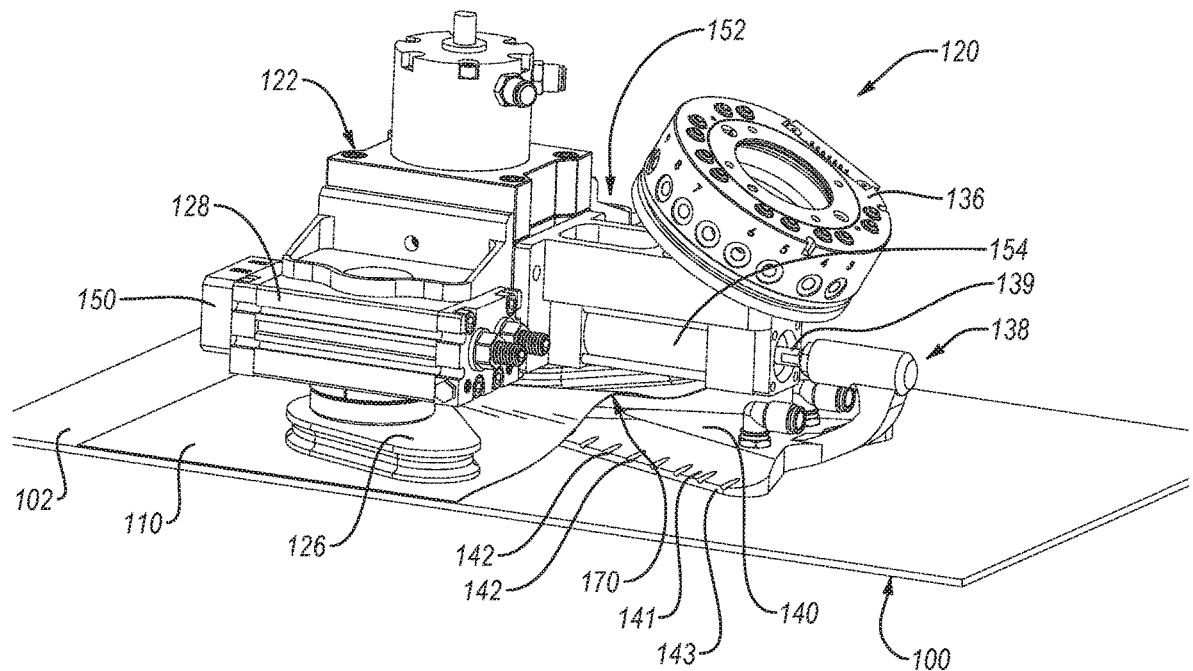
FIG. 11 is a perspective view of the apparatus of FIG. 3, shown in the engaged position with a separation mechanism of the apparatus inserted into a buckle of the first material formed by the buckling mechanism, according to one or more examples of the present disclosure.
Figure 12:
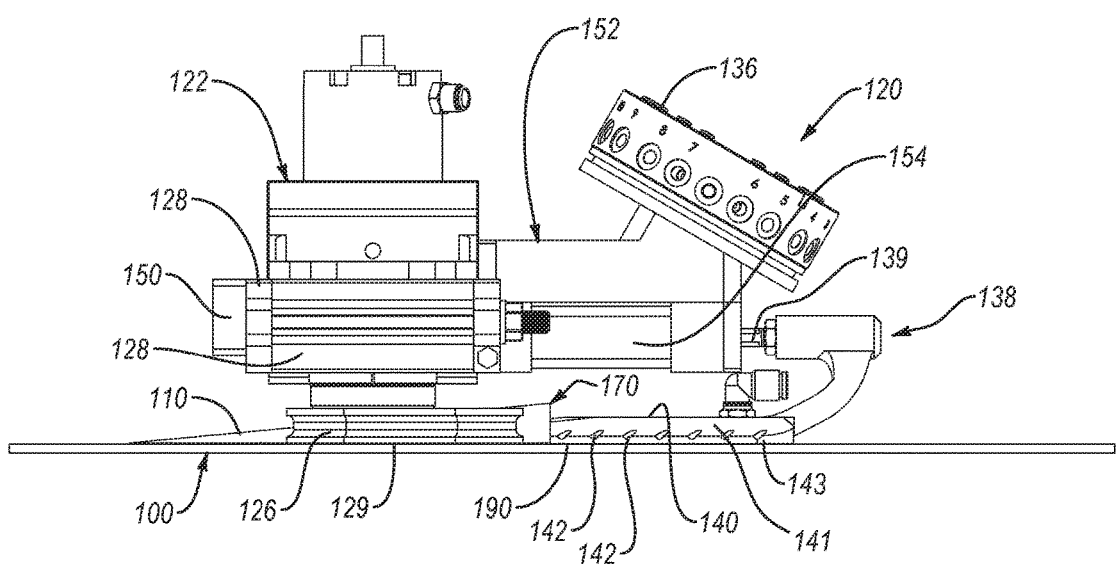
FIG. 12 is a side elevation view of the apparatus of FIG. 3, shown in the engaged position with the separation mechanism inserted into the buckle of the first material, according to one or more examples of the present disclosure.
Figure 13:
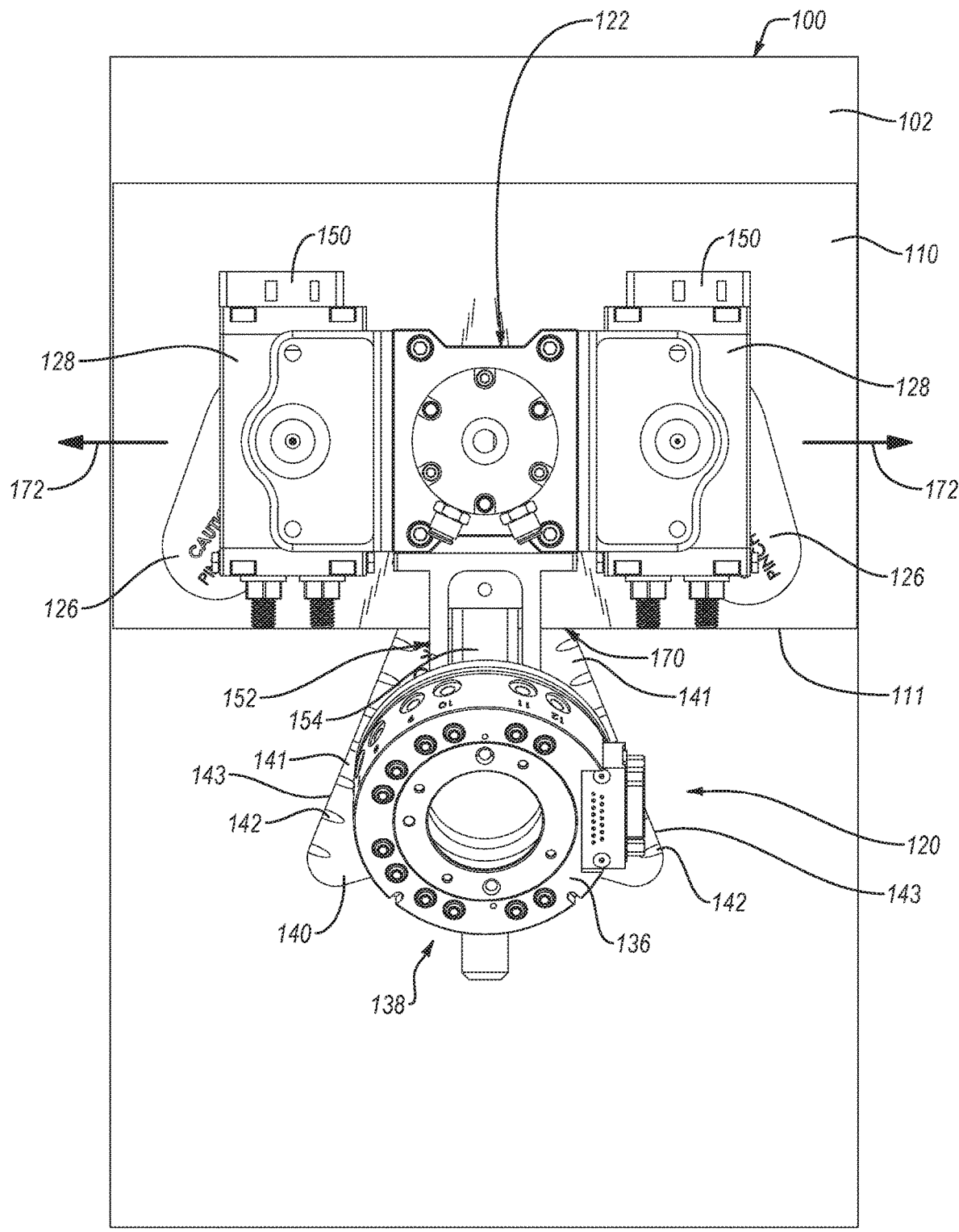
FIG. 13 is a top plan view of the apparatus of FIG. 3, shown in the engaged position with the separation mechanism inserted into the buckle of the first material, according to one or more examples of the present disclosure.

Referring back to FIG. 16, the method 200 further includes (block 210) inserting the wedge 140 in an insertion direction 168 into the buckle 170 formed in the first material 110. This step is performed automatically in some examples. As shown in FIGS. 11-13 and according to one example, the step of block 210 is accomplished by selectively operating the second actuator 154 of the separation mechanism 138 to linearly translationally move the wedge 140 in the insertion direction 168 toward the leading edge 111 of the first material 110 and into the space defined between the buckle 170 and the surface 102 of the carrier 100. Accordingly, as used herein, inserting the wedge 140 into the buckle 170 means inserting the wedge 140 into the space defined between the buckle 170 and the surface 102 of the carrier 100.

In the illustrated example, the second actuator 154 is attached to the body 152 of the apparatus 120. In certain implementations, the second actuator 154 is a linear actuator that includes a piston rod 139 that is co-movably attached to the wedge 140 and is linearly movable relative to the body 152 of the apparatus 120. The second actuator 154 is attached to the body 152 such that the piston rod 139 moves along or is parallel to the midplane of the apparatus 120. In some examples, the piston rod 139 moves perpendicularly relative to the leading edge 111 of the first material 110 when the apparatus 120 is engaged with the first material 110. The second actuator 154 is selectively actuatable in this manner to move the wedge 140 in the insertion direction 168 from a non-separating position (see, e.g., FIGS. 4-10) to a separating position (see, e.g., FIGS. 11-13).

According to some examples, the piston rod 139 of the separation mechanism 138 suspends the wedge 140 relative to the body 152. In some examples, the piston rod 139 suspends the wedge 140 such that a carrier engagement surface 190 of the wedge 140 is substantially co-planar with the material engagement surfaces 129 of the grippers 126. When the apparatus 120 is engaged with the first material 110, the carrier engagement surface 190 is configured to ride along the surface 102 of the carrier 100 as the wedge 140 is moved by the second actuator 154 and as the wedge 140 moves relative to the first material 110. The position of the apparatus 120 relative to the leading edge 111 of the first material 110 and the range of travel of the piston rod 139 are coordinated so that when the apparatus 120 is engaged with the first material 110 and the wedge 140 is in the separating position, the wedge 140 is inserted into the buckle 170.

The wedge 140 is configured to act as a spatula for penetrating between the first material 110 and the surface 102 of the carrier 100 and separating the first material 110 from the surface 102. In the illustrated examples, the wedge 140 has leading edges 143 that converge together at the portion of the wedge 140 that first enters the buckle 170. In other words, the leading edges 143 converge, relative to a hypothetical plane perpendicular to the surface 102 of the carrier 100, passing through the wedge 140, and parallel with the insertion direction 168 (e.g., a midplane of the apparatus 120), toward the buckle 170 when the grippers 126 are frictionally engaged with the first material 110 and form the buckle 170. The leading edges 143 can be partially blunt or sharp. The wedge 140 is relatively thin compared to its length and width. The convergence of the leading edges 143 results in a decreasing width of the wedge 140. To help facilitate separation of the first material 110 from the carrier 100, the wedge 140 also includes blade surfaces 141 that terminate at corresponding leading edges 143. Each blade surface 141 tapers along the wedge 140 in a direction perpendicular to the corresponding one of the leading edges 143. Accordingly, in some examples, the wedge 140 tapers down to the leading edges 143. Although the wedge 140, in the illustrated examples, has two leading edges 143, each associated with one of two blade surfaces 141, in other examples, the wedge 140 has a single leading edge 143 and one blade surface 141 associated with the single leading edge 143.

According to some examples, the wedge 140 additionally includes one or more pneumatic ports 142 that are coupleable to a gas source. Gas from the gas source is selectively introduced to the pneumatic ports 142 where the gas is expelled from the pneumatic ports. The pneumatic ports 142 may be outlets of conduits extending through the wedge 140 and fluidly coupled to the gas source. In the illustrated examples, the pneumatic ports 142 are formed in the blade surfaces 141 of the wedge 140. As the wedge 140 is moved between the first material 110 and the carrier 100 to separate the first material 110 from the carrier 100, the gas can be expelled from the pneumatic ports to help facilitate the separation. When expelled, the gas impacts the first material 110 to urge the first material 110 away from the wedge 140, which promotes the ability of the wedge 140 to separate the first material 110 from the carrier 100. Although the use of a gas has been described, in other examples, the pneumatic ports 142 can be used to expel any of various fluids received from a fluid source.

Referring back to FIG. 16, after the wedge 140 is inserted into the buckle 170 at block 210 and if the apparatus 120 is configured to be selectively clamped onto the first material 110, the method 200 further includes (block 212) selectively unclamping the grippers 126 from the first material 110 on the surface 102 of the carrier 100. In some examples, selectively unclamping the grippers 126 includes deactivating the magnet(s) of the electromagnet device 125. According to other examples, selectively unclamping the grippers 126 includes releasing the suction force on the first material 110 by turning off the vacuum 162.

After the apparatus 120 is selectively unclamped from the first material 110 at block 212 or if the apparatus 120 was not clamped to the first material 110, and with the wedge 140 inserted into the buckle 170, the method 200 includes (block 214) moving the wedge 140 in a removal direction 172 along the surface 102 of the carrier 100 (see, e.g., FIG. 13). The removal direction 172 is substantially perpendicular to the insertion direction 168 in some examples. Because the wedge 140, being inserted into the buckle 170, is between the first material 110 and the surface 102 of the carrier 100, movement of the wedge 140 in the removal direction 172 forces the first material 110 away from the surface 102 to separate the first material 110 from the surface 102. The wedge 140 is moved along enough of the surface 102 of the carrier 100 to separate enough (e.g., all) of the first material 110 from the surface 102 to remove all of a continuous piece of first material 110 from the surface 102. In some examples, the wedge 140 can be moved in any of various directions (e.g., not just the removal direction 172) as needed to separate the first material 110 from the surface 102 as long as the wedge 140 remains between the first material 110 and the surface 102.

Referring back to FIGS. 3 and 4, in some examples, the apparatus 120 further includes a position sensor 150 that is configured to detect a position of the apparatus 120 relative to the carrier 100. More specifically, in certain examples, the position sensor 150 is configured to detect a distance between the position sensor 150 and the first material 110 on the surface 102 of the carrier 100. The position sensor 150 is useful to properly locate the apparatus 120 on the first material 110 and to prevent damaging impacts with the carrier 100 when doing so. In some examples, the apparatus 120 includes multiple position sensors 150 each non-movably fixed relative to the body 152 of the apparatus 120. In the illustrated example, each one of the position sensors 150 is attached directly to a corresponding one of the first actuators 128.

Although the apparatus 120 in the examples shown in FIGS. 3-13 is configured for automatic control and positioning by a robot 132, in other examples, such as shown in FIGS. 14 and 15, the apparatus 120 is configured for manual control and positioning. More specifically, in some examples, the apparatus 120 includes a manual handling assembly 180 that is non-movably fixed to the body 152 of the apparatus 120. Accordingly, the manual handling assembly 180 is at least indirectly coupled to the clamping mechanism 122, the buckling mechanism 124, and the separation mechanism 138 of the apparatus 120. The manual handling assembly 180 includes manual handles 184 that extend from the body 152. The manual handles 184 are shaped to provide ergonomic grips for manually grasping and moving the apparatus 120, such as to position the apparatus 120 on the first material 110 prior to forming the buckle 170 and move the apparatus 120 along the first material 110 using the wedge 140. In some examples, the manual handles 184 include arm rests 182 configured to receive and support the forearm of a user. The manual handling assembly 180 also includes a control interface 186 operably coupled with the clamping mechanism 122, the buckling mechanism 124, and the separation mechanism 138. In certain examples, the control interface 186 includes control devices (e.g., dials, switches, buttons, touchscreens, etc.) that are manually selectable by a user to control the automated operations of the apparatus 120.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagrams included herein are generally set forth as logical flow chart diagrams. As such, the depicted order and labeled steps are indicative of one example of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present subject matter may be embodied in other specific forms without departing from its spirit or essential characteristics. The described examples are to be considered in all respects only as illustrative and not restrictive. All changes which come within the meaning and range of equivalency of the claims are to be embraced within their scope.

What is claimed is:

1. An apparatus for removing material from a surface of a carrier, the apparatus comprising:
   a buckling mechanism, comprising a gripper configured to engage the material, wherein, when engaged with the material, the gripper is movable relative to the surface of the carrier to move the material relative to the surface of the carrier and to form a buckle in the material; and
   a separation mechanism, coupled to the buckling mechanism and comprising a wedge that is movable relative to the surface of the carrier to be insertable into the buckle formed in the material.

2. The apparatus according to claim 1, further comprising a clamping mechanism coupled to the buckling mechanism and the separation mechanism and configured to selectively clamp the apparatus onto the material when the material is on the surface of the carrier, wherein:
   the gripper frictionally engages the material when the apparatus is selectively clamped onto the material by the clamping mechanism;
   the wedge is insertable into the buckle when the apparatus is selectively clamped onto the material by the clamping mechanism; and
   the clamping mechanism is configured to selectively unclamp the apparatus from the material after the wedge is inserted into the buckle formed in the material.

3. The apparatus according to claim 2, wherein the clamping mechanism comprises at least one magnet that is selectively activatable to magnetically couple the apparatus to the carrier.

4. The apparatus according to claim 2, wherein the clamping mechanism comprises at least one vacuum that is selectively operable to generate a suction force between the apparatus and the carrier.

5. The apparatus according to claim 1, wherein the gripper is rotatable relative to the surface of the carrier to move the material relative to the surface of the carrier.

6. The apparatus according to claim 5, wherein:
   the gripper is rotatable about a rotational axis;
   the gripper is asymmetrical relative to a virtual plane; and
   the rotational axis lies within the virtual plane.

7. The apparatus according to claim 6, wherein the gripper is shaped to eccentrically rotate about the rotational axis.

8. The apparatus according to claim 6, wherein:
   the buckling mechanism comprises two grippers each configured to engage a different one of two portions of the material; and
   the two grippers are counter-rotatable relative to each other to move the two portions of the material, relative to the surface of the carrier, and to move the two portions of the material toward each other, such that the buckle forms between the two grippers.

9. The apparatus according to claim 5, wherein:
   the gripper comprises a material engagement surface that comprises friction-enhancing features; and
   the friction-enhancing features comprise a series of protrusions.

10. The apparatus according to claim 1, wherein:
    the wedge is translationally movable relative to the surface of the carrier in an insertion direction for insertion of the wedge into the buckle; and
    the wedge comprises at least one leading edge and at least one blade surface that terminates at the at least one leading edge and tapers along the wedge in a direction perpendicular to the at least one leading edge.

11. The apparatus according to claim 10, wherein the at least one leading edge converges, relative to a hypothetical plane perpendicular to the surface of the carrier, passing through the wedge, and parallel with the insertion direction, toward the buckle when the gripper is engaged with the material and forms the buckle.

12. The apparatus according to claim 11, wherein:
    the wedge comprises two leading edges and two blade surfaces each corresponding with a respective one of the two leading edges; and
    the two leading edges converge toward each other.

13. The apparatus according to claim 1, wherein the wedge comprises a plurality of pneumatic ports through which a gas is forcibly expellable.

14. The apparatus according to claim 13, wherein:
    the wedge is translationally movable relative to the surface of the carrier in an insertion direction for insertion of the wedge into the buckle;
    the wedge comprises at least one leading edge and at least one blade surface that terminates at the at least one leading edge and tapers along the wedge in a direction perpendicular to the at least one leading edge; and
    the plurality of pneumatic ports are formed in the at least one blade surface of the wedge.

15. The apparatus according to claim 1, further comprising a position sensor that is translationally fixed relative to the gripper and configured to detect a distance between the position sensor and the material on the surface of the carrier.

16. The apparatus according to claim 1, further comprising a robot coupler coupled to the buckling mechanism and the separation mechanism, wherein the robot coupler is configured to interface with an apparatus coupler of a robot.

17. The apparatus according to claim 1, further comprising a manual handling assembly coupled to the buckling mechanism and the separation mechanism, wherein the manual handling assembly comprises a manual control interface and manual handles.

18. A system, comprising:
    a positioning tool, comprising an apparatus coupler;
    an apparatus for removing material from a surface of a carrier, the apparatus comprising:
      a positioning-tool coupler, releasably coupleable to the positioning tool;
      a buckling mechanism, comprising a first actuator and a gripper configured to engage the material, wherein, when engaged with the material, the gripper is movable relative to the surface of the carrier, via operation of the first actuator, to move the material relative to the surface of the carrier and to form a buckle in the material;
      a separation mechanism, coupled to the buckling mechanism and comprising a second actuator and a wedge that is movable relative to the surface of the carrier, via operation of the second actuator, to be insertable into the buckle formed in the material; and a clamping mechanism coupled to the buckling mechanism and the separation mechanism and configured to selectively clamp the apparatus onto the material when the material is on the surface of the carrier, wherein:

the gripper engages the material when the apparatus is selectively clamped onto the material by the clamping mechanism;

the wedge is insertable into the buckle when the apparatus is selectively clamped onto the material by the clamping mechanism; and the clamping mechanism is configured to selectively unclamp the apparatus from the material after the wedge is inserted into the buckle formed in the material.

19. A method of removing a first material from a surface of a carrier, the method comprising:

positioning a buckling mechanism onto a first material on a surface of the carrier such that a gripper of the buckling mechanism is engaged with the first material;

moving the gripper relative to the surface of the carrier to move the first material relative to the surface of the carrier and to form a buckle in the first material;

inserting a wedge in an insertion direction into the buckle formed in the first material; and with the wedge inserted into the buckle, moving the wedge in a removal direction along the surface of the carrier.

20. The method according to claim 19, further comprising:

selectively clamping the gripper onto the first material on the surface of the carrier while the gripper is moved relative to the surface of the carrier to form the buckle and while the wedge is inserted into the buckle; and selectively unclamping the gripper from the first material on the surface of the carrier after inserting the wedge into the buckle and before moving the wedge in the removal direction along the surface of the carrier.

* * * * *